(12) United States Patent
Wu et al.

(10) Patent No.: US 9,591,622 B2
(45) Date of Patent: Mar. 7, 2017

(54) CHANNEL ASSIGNMENT, ACQUISITION METHOD AND APPARATUS

(71) Applicant: Tencent Technology (Shenzhen) Company Limited, Shenzhen (CN)

(72) Inventors: Mingjin Wu, Shenzhen (CN); Lingling Zou, Shenzhen (CN); Bin Ma, Shenzhen (CN); Erying Zhuo, Shenzhen (CN); Jun Qiu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 74 days.

(21) Appl. No.: 14/794,640

(22) Filed: Jul. 8, 2015

(65) Prior Publication Data
US 2015/0312897 A1     Oct. 29, 2015

Related U.S. Application Data

(63) Continuation of application No. PCT/CN2013/087277, filed on Nov. 15, 2013.

(30) Foreign Application Priority Data

Jan. 9, 2013    (CN) .......................... 2013 1 00072293

(51) Int. Cl.
*H04W 72/04*     (2009.01)
*H04W 72/00*     (2009.01)

(52) U.S. Cl.
CPC ....... *H04W 72/0406* (2013.01); *H04W 72/00* (2013.01)

(58) Field of Classification Search
CPC ... H04W 52/0216; H04W 4/14; H04W 12/02; H04W 68/00; H04W 4/06;
(Continued)

(56) References Cited

U.S. PATENT DOCUMENTS 5,577,115 A * 11/1996 Deutsch ................ H04M 1/253
370/359
5,987,028 A * 11/1999 Yang .................... H04L 49/1507
370/380

(Continued)

FOREIGN PATENT DOCUMENTS

CN         1138938 A      12/1996
CN         1306353 A      8/2001
(Continued)

OTHER PUBLICATIONS

Tencent Technology, Written Opinion, PCT/CN2013/087277, Feb. 20, 2014, 11 pgs.

(Continued)

*Primary Examiner* — Jung-Jen Liu
(74) *Attorney, Agent, or Firm* — Morgan, Lewis & Bockius LLP

(57) ABSTRACT

The present disclosure is applied to the field of communications, and provides a channel assignment, acquisition method and system, the assignment method including: selecting at least one idle channel from idle channels of a multi-channel sharing system as a control channel; sending an idle signal to the control channel, the idle signal identifying that the control channel is a control channel for a customer premise equipment (CPE) to be positioned therein in a preset positioning manner; and upon receipt of a communication request from a CPE positioned to the control channel, assigning the control channel to the CPE. The present disclosure, by selecting one idle channel as a control channel, positioning a CPE to the control channel after the (Continued)

CPE scans the control channel, and conducting communication through the control channel, can not only achieve dynamic assignment of the channel, but also make the amount of computation of the dynamic assignment small and control complexity of the dynamic assignment lower.

14 Claims, 6 Drawing Sheets

(58) Field of Classification Search
CPC ... H04L 1/1809; H04L 1/0061; H04L 1/0057; H04L 1/20; H04L 1/18; H04L 1/0083; H04L 63/0428; H04L 1/08; H04L 1/0059; H04L 1/1614; H04B 7/2656; H04B 7/24
See application file for complete search history.

(56) References Cited

U.S. PATENT DOCUMENTS

| | | | | |
|---|---|---|---|---|
| 5,991,292 A | * | 11/1999 | Focsaneanu | H04L 12/2801 370/352 |
| 6,757,298 B1 | * | 6/2004 | Burns | H04L 12/4608 370/395.53 |
| 2002/0039372 A1 | * | 4/2002 | Christie | H04J 3/125 370/522 |
| 2003/0149848 A1 | * | 8/2003 | Ibrahim | G06F 3/0601 711/154 |

FOREIGN PATENT DOCUMENTS

| | | |
|---|---|---|
| CN | 1516359 A | 7/2004 |
| CN | 1719793 A | 1/2006 |
| CN | 1909519 A | 2/2007 |
| CN | 101951559 A | 1/2011 |

OTHER PUBLICATIONS

Tencent Technology, IPRP, PCT/CN2013/087277, Jul. 14, 2015, 6 pgs.
Tencent Technology, ISR, PCT/CN2013/087277, Feb. 20, 2014, 2 pgs.

* cited by examiner

(12) United States Patent

CHANNEL ASSIGNMENT, ACQUISITION METHOD AND APPARATUS

RELATED APPLICATIONS

This application is a continuation application of PCT Patent Application No. PCT/CN2013/087277, entitled "Channel Allocation and Acquisition Method and Device" filed on Nov. 15, 2013, which claims priority to Chinese Patent Application No. 2013100072293, filed with the State Intellectual Property Office of the People's Republic of China on Jan. 9, 2013, and entitled "Channel Allocation and Acquisition Method and Device", both of which are incorporated herein by reference in their entirety.

FIELD OF THE TECHNOLOGY

The present disclosure belongs to the field of communications, and particularly relates to a channel assignment, acquisition method and apparatus.

BACKGROUND OF THE DISCLOSURE

With rapid development of information technologies, people have increasingly higher requirements for network communications, and wish to break restrictions of different regional or objective conditions, to achieve a goal that anyone can communicate with anyone in any way anywhere at any time. As an important part of personal communications, a wireless local area network (LAN) has contributed to a new wave of mobile computing, and will be widely used in reality and future social life. The LAN replaces the traditional cable with electromagnetic waves in the air for information transmission, and can be used as extension, supplement or replacement of the traditional cable network. In comparison, the LAN has advantages in respects of mobility, flexibility, scalability and economical efficiency. However, wireless communications also face a larger problem, that is, channel congestion. A channel is a passage of information transmission between a source and a destination, which is achieved through a transmission media or a transmission medium.

In order to solve the problem of channel congestion, a fixed channel assignment method and a dynamic channel assignment method are provided. The process of the fixed channel assignment method is briefly introduced as follows: dividing an entire service area into a certain number of cells, each cell being equipped with a certain number of channels according to a certain channel multiplexing form, equivalent to completely isolating the channels between different cells of a cell group, and such a fixed channel assignment method can meet certain signal quality. A call admission control policy of fixed channel assignment is as follows: when a new call requires admission, the call is accepted if a corresponding cell has an idle channel. Such a manner cannot automatically adjust channel assignment with business conditions and user distribution. The process of the dynamic channel assignment method is briefly introduced as follows: all channel resources are completely shared, when there is admission of a new call, and in channels that meet the minimum carrier-to-interference ratio threshold, an appropriate channel is selected according to a certain algorithm to serve admission of the call; although such a manner can achieve dynamic assignment of the channel, computation and control complexity thereof are high.

SUMMARY

Embodiments of the present invention provide a channel assignment method, aimed at solving problems of great amount of computation and high control complexity existing in the existing dynamic channel assignment method.

In a first aspect, a channel assignment method is performed at a multi-channel sharing system that is communicatively coupled to a plurality of customer premise equipments, the method including:

selecting at least one idle channel from idle channels of a multi-channel sharing system as a control channel;

sending an idle signal to the control channel, the idle signal identifying that the control channel is a control channel for a customer premise equipment (CPE) to be positioned therein in a preset positioning manner; and assigning the control channel to a CPE corresponding to a communication request upon receipt of the communication request.

In a second aspect, a method of using a channel for communication is performed at a customer premise equipment (CPE) that is communicatively coupled to a multi-channel sharing system, the method including:

scanning channels in the multi-channel sharing system for one or more control channels having idle signals;

positioning one control channel in a multi-channel sharing system in a preset positioning manner, the control channel being an idle channel having an idle signal in the multi-channel sharing system; and using the control channel for communication in response to a communication request.

In a third aspect, a channel assignment system is provided, the system including:

a control device, configured to select at least one idle channel from idle channels of a multi-channel sharing system as a control channel;

an emitter in communication connection with the control device, configured to send an idle signal to the control channel, the idle signal identifying that the control channel is a control channel for a CPE to be positioned therein in a preset positioning manner; and a receiver, configured to receive a communication request, wherein, when the receiver receives the communication request, the control device is configured to assign the control channel to a CPE corresponding to the communication request.

In a fourth aspect, a CPE that uses a channel for communication is provided, including:

a controller, configured to position the CPE to one control channel in a multi-channel sharing system in a preset positioning manner, the control channel being an idle channel having an idle signal in the multi-channel sharing system; and a transceiver in communication connection with the controller, configured to use the control channel for communication in response to a communication request.

In the embodiments of the present invention, by selecting one idle channel as a control channel, positioning a CPE to the control channel after the CPE scans the control channel, and conducting communication through the control channel, not only can dynamic assignment of the channel be achieved, but also the amount of computation of the dynamic assignment is not great and control complexity of the dynamic assignment is lower.

DESCRIPTION OF EMBODIMENTS

In order to make the objectives, technical solutions and advantages of the present disclosure clearer, implementations of the present disclosure are further described below in detail with reference to the accompanying drawings. It should be understood that, the specific embodiments described herein are merely intended to explain the present disclosure, but not to limit the present disclosure.

In the embodiments of the present invention, by selecting one idle channel as a control channel, positioning a CPE to the control channel after the CPE scans the control channel, and conducting communication through the control channel, not only can dynamic assignment of the channel be achieved, but also the amount of computation of the dynamic assignment is not great and control complexity of the dynamic assignment is lower.

In order to illustrate the technical solution of the present disclosure, description is given below through specific embodiments.

Figure 1:
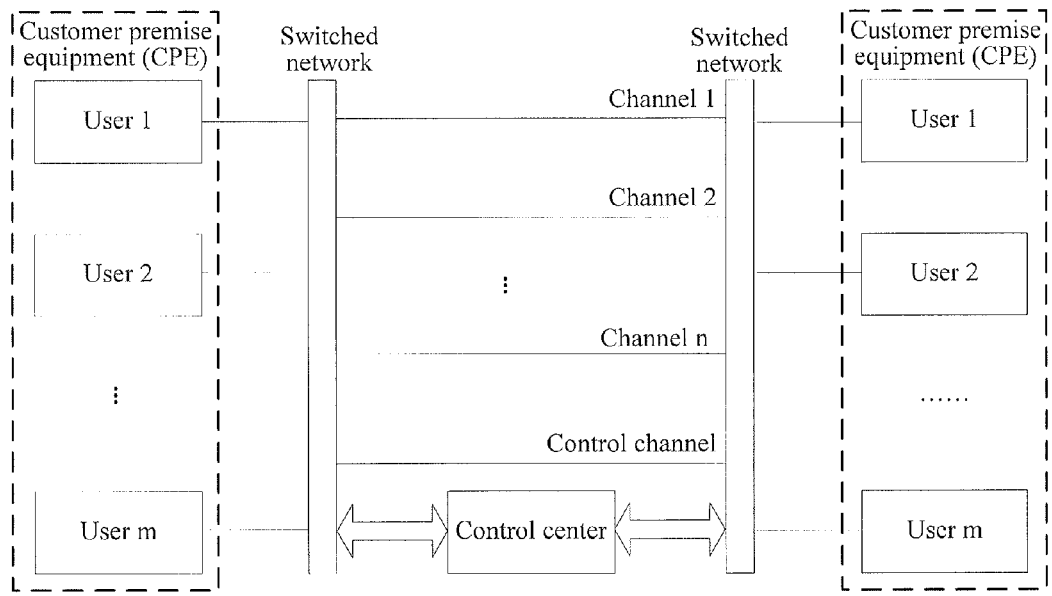
FIG. 1 is a structural diagram of a multi-channel sharing system to which a channel assignment method is applied according to one embodiment of the present invention.

FIG. 1 illustrates a structure of a multi-channel sharing system to which a channel assignment method is applied according to one embodiment of the present invention, and for ease of description, only illustrates parts related to the embodiment of the present invention.

The multi-channel sharing system includes several CPEs, several channels and a control center.

The channels refer to channels through which the CPEs conduct communication therebetween, which are divided into control channels and data channels according to different signals transmitted through the channels. The control channels are generally configured to transmit signaling, which may use dedicated channels or share the same channel with the data channels. The data channels are generally configured to transmit voice and data services. In addition, according to busy and idle states of the channels, the channels may be divided into idle channels and occupied channels.

The control center is responsible for assignment of the idle channels, when a CPE in the multi-channel sharing system requires communication, the CPE sends a request to the control center, the control center assigns a channel thereto, and the CPE conducts communication through the channel assigned thereto by the control center.

Figure 2:
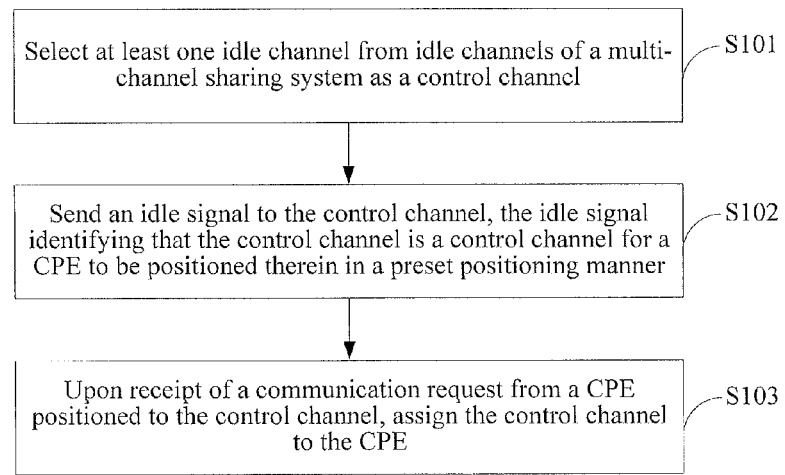
FIG. 2 is a flowchart of implementation of a channel assignment method according to one embodiment of the present invention.

FIG. 2 is a flowchart of implementation of a channel assignment method according to one embodiment of the present invention; the method is applied to the control center in FIG. 1, which is detailed as follows:

S101. A control center selects at least one idle channel from idle channels of a multi-channel sharing system as a control channel.

In the implementation, when the control center selects at least one idle channel from idle channels of a multi-channel sharing system as a control channel, the selection may be made randomly or made according to a preset selection rule, which is not limited herein. The control center can select one idle channel, some idle channels or all idle channels from the multi-channel sharing system as control channels.

The manner of judging whether a channel is an idle channel may be any manner provided in the existing technology, for example, a channel with the minimum channel interference value is selected from all the channels as an idle channel.

S102. Send an idle signal to the control channel, the idle signal identifying that the control channel is a control channel for a CPE to be positioned therein in a preset positioning manner.

In the embodiment, the control center sends an idle signal to all control channels, so that the CPE determines whether a channel is a control channel by judging whether the channel has the idle signal when the CPE scans the channels in the multi-channel sharing system.

The preset positioning manner includes, but is not limited to, cyclic fixed channel assignment, cyclic unfixed channel assignment and cyclic distributed channel assignment. When the control center selects one idle channel from the multi-channel sharing system as a control channel, the CPE is positioned to the control channel through cyclic fixed channel assignment; when the control center selects two or more idle channels from the multi-channel sharing system as control channels and sends an idle signal to the control channels, the CPE is positioned to one control channel in the multi-channel sharing system through cyclic unfixed channel assignment or cyclic distributed channel assignment.

The cyclic fixed channel assignment means that the CPE scans channels in the multi-channel sharing system according to a preset channel scan order, and when scanning a control channel having the idle signal, the CPE is positioned to the control channel having the idle signal.

The cyclic unfixed channel assignment means that, when communication is unnecessary, the CPE is positioned to one control channel in the multi-channel sharing system when the CPE cyclically scans the channels in the multi-channel sharing system according to a preset channel scan order all the time until the multi-channel sharing system receives a communication request.

If the CPE cyclically scans the channels in the multi-channel sharing system according to a preset channel scan order all the time, after the control center receives a calling request, when one control channel is selected from all the control channels to send a holding signal, a CPE not in communication in the multi-channel sharing system scans the channels in the multi-channel sharing system according to a preset channel scan order, and when scanning a control signal having the holding signal, the CPE is locked to the control signal having the holding signal, so as to be positioned to the control signal having the holding signal; when the CPE receives a calling request input by a user, the CPE not in communication in the multi-channel sharing system scans the channels in the multi-channel sharing system according to a preset channel scan order, and is positioned to a first-scanned control channel having an idle signal.

The cyclic distributed channel assignment means that the CPE in the multi-channel sharing system scans the channels in the multi-channel sharing system according to a preset channel scan order, and is positioned to a first-scanned control channel having an idle signal.

In one embodiment of the present invention, when the control center selects one idle channel from the multi-channel sharing system as a control channel, an idle signal is sent to the control channel, all CPEs not in communication in the multi-channel sharing system scan channels in the multi-channel sharing system according to a preset channel scan order, and when scanning a control channel having an idle signal, the CPEs are positioned to the control channel having an idle signal. As the control center only selects one idle channel as a control channel and sends an idle signal to the control channel, all CPEs not in communication in the multi-channel sharing system are all positioned to the control channel.

In another embodiment of the present invention, when the control center selects two or more idle channels from the multi-channel sharing system as control channels and sends an idle signal to the control channels, if the control center receives a called request, one is selected from all the control channels, a holding signal is sent to the selected control channel, all CPEs not in communication in the multi-channel sharing system scan channels in the multi-channel sharing system according to a preset channel scan order, and when scanning a control channel having the holding signal, the CPEs are locked to the control channel having the holding signal, so as to be positioned to the control channel having the holding signal; and if the CPE receives a calling request input by a user, all CPEs not in communication in the multi-channel sharing system scan channels in the multi-channel sharing system according to a preset channel scan order and are positioned to a first-scanned control channel having an idle signal.

In another embodiment of the present invention, when the control center selects two or more idle channels from the multi-channel sharing system as control channels and sends an idle signal to the control channels, all CPEs not in communication in the multi-channel sharing system scan channels in the multi-channel sharing system according to a preset channel scan order and are positioned to a first-scanned control channel having an idle signal.

S103. Upon receipt of a communication request from a CPE positioned to the control channel, assign the control channel to the CPE. In some embodiments, the communication request is a called request; in some other embodiments, the communication request is a calling request.

When the control center selects one idle channel from the multi-channel sharing system as a control channel, if the communication request is a called request, the assigning the control channel to a CPE corresponding to a communication request specifically includes:

A1. The control center sends a selective call signal to the control channel, to match the CPE positioned to the control channel with the selective call signal, and returns an acknowledgement signal after successful matching.

In this embodiment, when the control center receives the called request, the control center sends a selective call signal to the control channel, the selective call signal including a user ID (such as a telephone number) of a called user. All CPEs positioned to the control channel can receive the selective call signal through the control channel, each CPE matches the user ID included in the selective call signal with a user ID of the CPE (e.g., the local telephone number of the CPE), if the matching is successful, it indicates that a user of the CPE is the called user, and at this time, the CPE returns an acknowledgement signal to the control center through the control channel. If the matching is not successful, it indicates that the user of the CPE is not the called user, and an acknowledgement signal is no longer returned to the control center.

B1. The control center receives the acknowledgement signal returned by the CPE, and assigns the control channel to the CPE that returns the acknowledgement signal.

In this embodiment, when receiving the acknowledgement signal returned by the CPE, the control center assigns the control channel through which the acknowledgement signal is received to the CPE that returns the acknowledgement signal, so that the CPE can communicate with other CPEs through the assigned control channel.

When the control center selects one idle channel from the multi-channel sharing system as a control channel, if the communication request is a calling request, the assigning the control channel to a CPE corresponding to a communication request upon receipt of the communication request specifically includes:

when the communication request is a calling request sent by the CPE positioned to the control channel, the control center assigns the control channel to the CPE that sends the calling request.

In this embodiment, when the CPE receives a calling request input by a user, the calling request is sent to the control center through the control channel, and after receiving the calling request sent by the CPE, the control center assigns the control channel to the CPE that sends the calling request, so that the CPE occupies the control channel to communicate with another CPE that calls the CPE.

In another embodiment of the present invention, after the control center assigns the control channel to a certain CPE, the control center reselects one idle channel as a control channel and sends an idle signal to the reselected control channel, and other CPEs, when finding that the control channel where they are originally positioned has been occupied, immediately rescan the channels in the multi-channel sharing system, search for and are positioned to a new control channel having an idle signal.

In the embodiment of the present invention, as all channels can be used as control channels and data channels, channel utilization is high. Moreover, as all CPEs not in communication are positioned on the same control channel, both a calling party and a called party can timely conduct communication immediately through the control channel where they are positioned, so that the call processing speed is faster, especially when applied to a multi-channel sharing system with a limited number of users, i.e., fewer users, the call processing speed is better.

Figure 3:
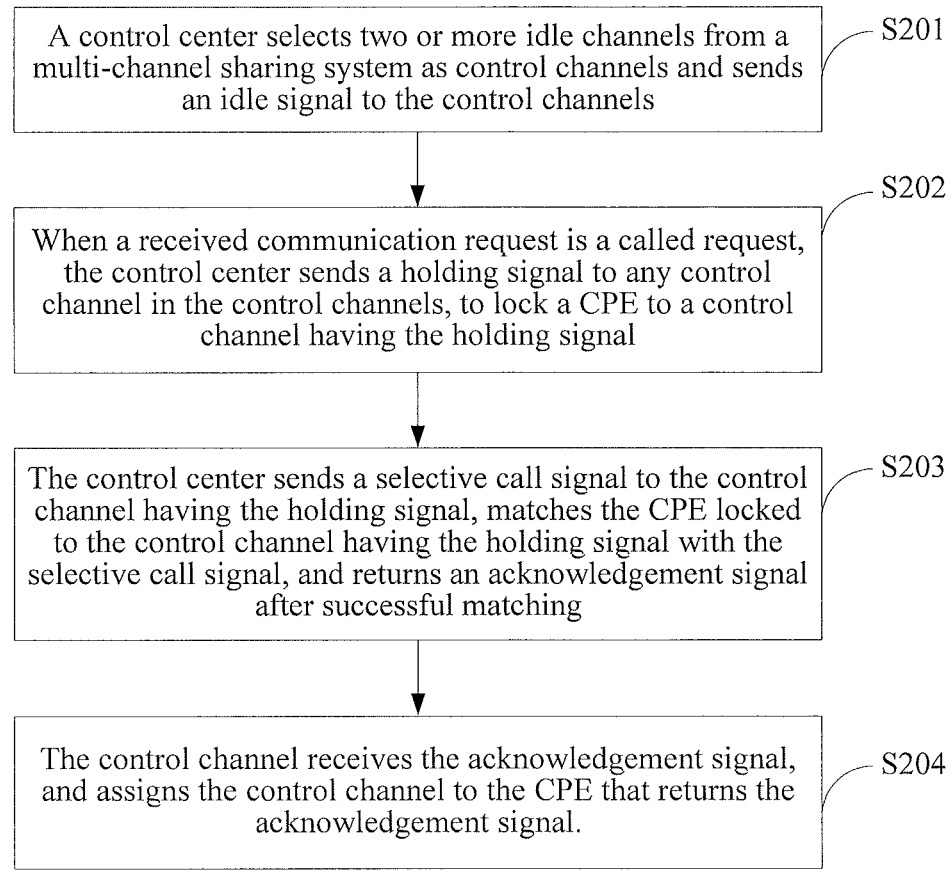
FIG. 3 is a flowchart of implementation of a channel assignment method according to another embodiment of the present invention.

FIG. 3 illustrates an implementation flow of a channel assignment method according to another embodiment of the present invention, which is detailed as follows:

S201. A control center selects two or more idle channels from a multi-channel sharing system as control channels and sends an idle signal to the control channels.

In this embodiment, two or more idle channels in the multi-channel sharing system are used as control channels, and the control center sends an idle signal to the control channels. CPEs not in communication in the multi-channel sharing system are always in a cyclic scan state, to scan a control channel having an idle signal in the multi-channel sharing system.

S202. When a received communication request is a called request, the control center sends a holding signal to any control channel in all the control channels, to lock a CPE to a control channel having the holding signal.

In this embodiment, when the communication request received by the control center is a called request, the control center sends a holding signal to any control channel in all the control channels. When a CPE not in communication in the multi-channel sharing system cyclically scans channels, if the CPE scans a control channel having the holding signal, the CPE is locked to the control channel having the holding signal, and the holding signal is kept for a period of time, until all CPEs not in communication in the multi-channel sharing system are locked to the control channel having the holding signal.

S203. The control center sends a selective call signal to the control channel having the holding signal, matches the CPE locked to the control channel having the holding signal with the selective call signal, and returns an acknowledgement signal after successful matching.

In this embodiment, when CPEs not in communication in the multi-channel sharing system are locked to the control channel having the holding signal, the control center sends a selective call signal to the control channel having the holding signal, as the control channels through which the control center sends the holding signal and the selective call signal are the same control channel, that is, the CPEs previously locked to the control channel having the holding signal are locked to the control channel having the holding signal at this time, the CPEs locked to the control channel having the holding signal all can receive the selective call signal, a user ID in the selective call signal (e.g., a telephone number of a called user) is matched with user IDs of the CPEs (e.g., local telephone numbers of the CPEs), if the matching is successful, an acknowledgement signal is returned to the control center through the control channel having the selective call signal, and if the matching is not successful, no acknowledgement signal is returned to the control center, and the locked control channel is immediately released, to perform cyclic scan once again.

S204. The control channel receives the acknowledgement signal, and assigns the control channel to the CPE that returns the acknowledgement signal.

In this embodiment, after receiving the acknowledgement signal returned by the CPE through the control channel, the control center assigns the control channel to the CPE that returns the acknowledgement signal. As the control channel through which the acknowledgement signal is returned is the control channel where the CPE is previously locked, the control channel where the CPE that returns the acknowledgement signal is locked is assigned to the CPE that returns the acknowledgement signal.

In this embodiment, as all the idle channels are used as control channels, the CPE in the multi-channel sharing system can scan different control channels through cyclic scan, when not receiving a called request, the CPE in the multi-channel sharing system will not be positioned to a certain channel, so that the selection of the communication channel is more flexible.

Figure 4:
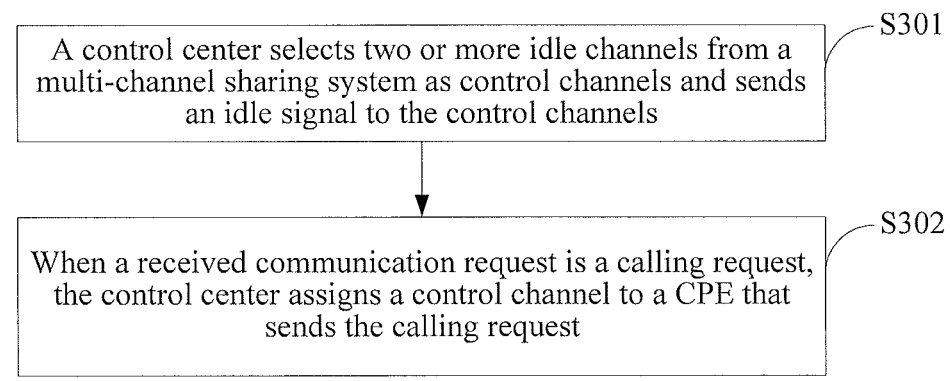
FIG. 4 is a flowchart of implementation of a channel assignment method according to another embodiment of the present invention.

FIG. 4 illustrates an implementation flow of a channel assignment method according to another embodiment of the present invention, which is detailed as follows:

S301. A control center selects two or more idle channels from a multi-channel sharing system as control channels and sends an idle signal to the control channels.

S302. When a received communication request is a calling request, the control center assigns a control channel to a CPE that sends the calling request. The control channel scanned by the CPE that sends the calling request refers to a control channel in the multi-channel sharing system first scanned by the CPE according to a preset channel scan order after receiving a calling request input by a user.

In this embodiment, a CPE not in communication in the multi-channel sharing system can scan a control channel having an idle signal in the multi-channel sharing system through cyclic scan, when the CPE not in communication in the multi-channel sharing system receives a calling request input by a user and scans a control channel having an idle signal in the multi-channel sharing system through cyclic scan, the CPE is positioned to a first-scanned control channel having an idle signal and sends a calling request to the first-scanned control channel having an idle signal, and at this time, the control center assigns the control channel to the CPE that sends the calling request, and the CPE occupies the control channel for communication. The CPEs cyclically scan the channels in different orders.

In this embodiment, as two or more idle channels are used as control channels and the CPEs scan the channels in different orders, the CPEs, when receiving a calling request input by a user, use a control channel scanned to send the calling request to the control center, which greatly reduces the probability that two users simultaneously initiate a calling request and simultaneously occupy the same control channel, that is, the method in this embodiment can effectively reduce simultaneous-hold probability of the control channel.

Figure 5:
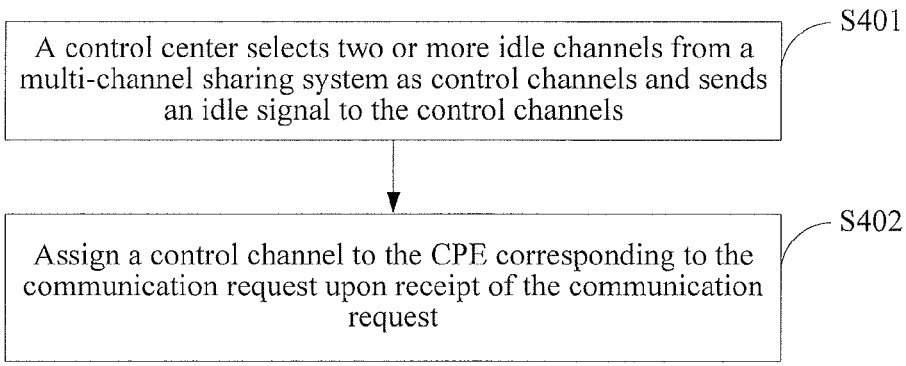
FIG. 5 is a flowchart of implementation of a channel assignment method according to another embodiment of the present invention.

FIG. 5 illustrates an implementation flow of a channel assignment method according to another embodiment of the present invention, which is detailed as follows:

S401. A control center selects two or more idle channels from a multi-channel sharing system as control channels and sends an idle signal to the control channels, to make CPEs respectively positioned to control channels first scanned.

In this embodiment, the control center uses two or more idle channels from a multi-channel sharing system as control channels and sends an idle signal to the control channels. CPEs not in communication in the multi-channel sharing system scan all channels in the multi-channel sharing system and are respectively positioned to control channels first scanned. The CPEs not in communication in the multi-channel sharing system scan all channels in the multi-channel sharing system randomly, so the control channels where the CPEs are positioned are also scattered.

S402. Assign a control channel to the CPE corresponding to the communication request upon receipt of the communication request. The specific process thereof is as follows:

A2. When the received communication request is a called request, the control center sends a selective call signal to the control channels, to match CPEs positioned to the control channels with the selective call signal, and a CPE successfully matching the selective call signal returns an acknowledgement signal through the control channel where it is positioned.

In this embodiment, when the received communication request is a called request, the control center sends a selective call signal to the control channels, in this way, the CPEs all can receive the selective call signal through control channels where they are positioned, a user ID in the selective call signal (e.g., a telephone number of a called user) is matched with user IDs of the CPEs (e.g., local telephone numbers of the CPEs), the CPE successfully matching the selective call signal returns an acknowledgement signal to the control center through the control channel where it is positioned, and other CPEs not successfully matching the selective call signal no longer return an acknowledgement signal to the control center.

B2. Receive the acknowledgement signal, and assign the control channel to the CPE that returns the acknowledgement signal.

In this embodiment, a control channel through which the acknowledgement signal is returned is the control channel where the CPE that returns the acknowledgement signal is positioned, therefore, when the control center assigns the control channel through which the acknowledgement signal is returned to the CPE that returns the acknowledgement signal after receiving the acknowledgement signal, that is, assigns the control channel to the CPE that returns the acknowledgement signal, the CPE can communicate with a calling user through the control channel after occupying the control channel.

In another embodiment of the present invention, the assigning a control channel to the CPE corresponding to the communication request upon receipt of the communication request specifically includes:

when the received communication request is a calling request, assigning a control channel to a CPE that sends the calling request.

In this embodiment, when the CPE receives a calling request input by a user, the CPE sends the calling request through the control channel where it is positioned, and the control center assigns the control channel where the CPE that sends the calling request is positioned to the CPE that sends the calling request after receiving the calling request through the control channel.

In the embodiment of the present invention, before the CPE conducts communication, CPEs in the multi-channel sharing system are respectively positioned to control channels scanned first, so communication can be conducted immediately by using the control channels where the CPEs are positioned upon receipt of a calling request, the control center sends a selective call signal on all the control channels at the same time upon receipt of a called request, and the CPEs all can receive the selective call signal, to cause a called speed to be fast, that is, the method causes a call processing speed to be fast. In addition, as the CPEs are respectively positioned to control channels scanned first, the control channels where the CPEs are positioned are scattered, thereby significantly reducing the probability that multiple CPEs simultaneously hold the same control channel, that is, the simultaneous-hold probability of the control channel is reduced.

Figure 6:
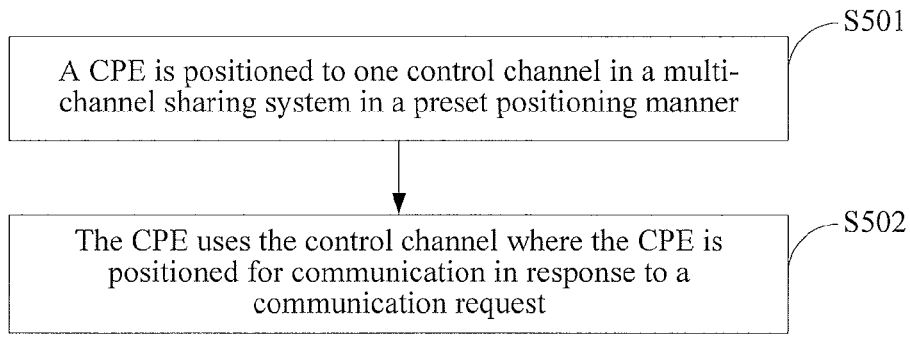
FIG. 6 is a flowchart of implementation of a method of using a channel for communication according to one embodiment of the present invention.

FIG. 6 illustrates a method of using a channel for communication according to one embodiment of the present invention, which is applied to a CPE and detailed as follows:

S501. A CPE is positioned to one control channel in a multi-channel sharing system in a preset positioning manner. The control channel is an idle channel having an idle signal in the multi-channel sharing system.

The preset positioning manner includes, but is not limited to, cyclic fixed channel assignment, cyclic unfixed channel assignment and cyclic distributed channel assignment.

When one idle channel is selected as a control channel and an idle signal is sent to the control channel, that a CPE is positioned to one control channel in a multi-channel sharing system through cyclic fixed channel assignment specifically includes:

scanning channels in the multi-channel sharing system, and when a control channel having an idle signal is scanned, positioning the CPE to the control channel having an idle signal.

When two or more idle channels are selected as control channels and an idle signal is sent to all the control channels, that a CPE is positioned to one control channel in a multi-channel sharing system through cyclic unfixed channel assignment specifically includes:

positioning the CPE to one control channel in the a multi-channel sharing system when the CPE in the multi-channel sharing system cyclically scans channels in the multi-channel sharing system according to a preset channel scan order until the multi-channel sharing system receives a communication request.

The positioning the CPE to one control channel in the a multi-channel sharing system when the CPE in the multi-channel sharing system cyclically scans channels in the multi-channel sharing system according to a preset channel scan order until the multi-channel sharing system receives a communication request specifically includes:

when the communication request is a called request, scanning the channels in the multi-channel sharing system according to a preset channel scan order, wherein, when scanning a control channel having a holding signal, the CPE is locked to the control channel having the holding signal, so as to be positioned to the control channel having the holding signal; and when the communication request is a calling request, scanning the channels in the multi-channel sharing system according to a preset channel scan order upon receipt of a calling request input by a user, and positioning the CPE to a first-scanned control channel having an idle signal.

When two or more idle channels are selected as control channels and an idle signal is sent to all the control channels, that a CPE is positioned to one control channel in a multi-channel sharing system through cyclic distributed channel assignment specifically includes:

scanning, by the CPE in the multi-channel sharing system, the channels in the multi-channel sharing system according to a preset channel scan order, and positioning the CPE to a first-scanned control channel having an idle signal.

S502. The CPE uses the control channel for communication in response to a communication request.

When one idle channel is selected as a control channel and an idle signal is sent to the control channel and the CPE is positioned to one control channel in the multi-channel sharing system through cyclic fixed channel assignment, the using the control channel for communication when the CPE receives a communication request specifically includes:

when the communication request is a called request, matching the CPE with a selective call signal in the control channel, and returning an acknowledgement signal to the control center after successful matching, to cause the control center to assign the control channel to the CPE; and when the communication request is a calling request, sending the calling request to the control center through the control channel, to cause the control center to assign the control channel to the CPE.

When two or more idle channels are selected as control channels and an idle signal is sent to all the control channels, the using the control channel for communication when the CPE is positioned to one control channel in the multi-channel sharing system through cyclic unfixed channel assignment specifically includes:

when the communication request is a called request, matching the CPE with a selective call signal in a control channel where the CPE is locked, and returning an acknowledgement signal to the control center after successful matching, to cause the control center to assign the control channel where the CPE is locked to the CPE; and when the communication request is a calling request, sending the calling request to the control center through a control channel first scanned by the CPE, to cause the control center to assign the control channel first scanned by the CPE to the CPE.

When two or more idle channels are selected as control channels and an idle signal is sent to all the control channels, the using the control channel for communication when the CPE is positioned to one control channel in the multi-channel sharing system through cyclic distributed channel assignment specifically includes:

when the communication request is a called request, matching the CPE with a selective call signal in a control channel scanned initially, and returning an acknowledgement signal to the control center after successful matching, to cause the control center to assign the control channel first scanned by the CPE to the CPE; and when the communication request is a calling request, sending the calling request to the control center through a control channel first scanned by the CPE, to cause the control center to assign the control channel first scanned by the CPE to the CPE.

Figure 13:
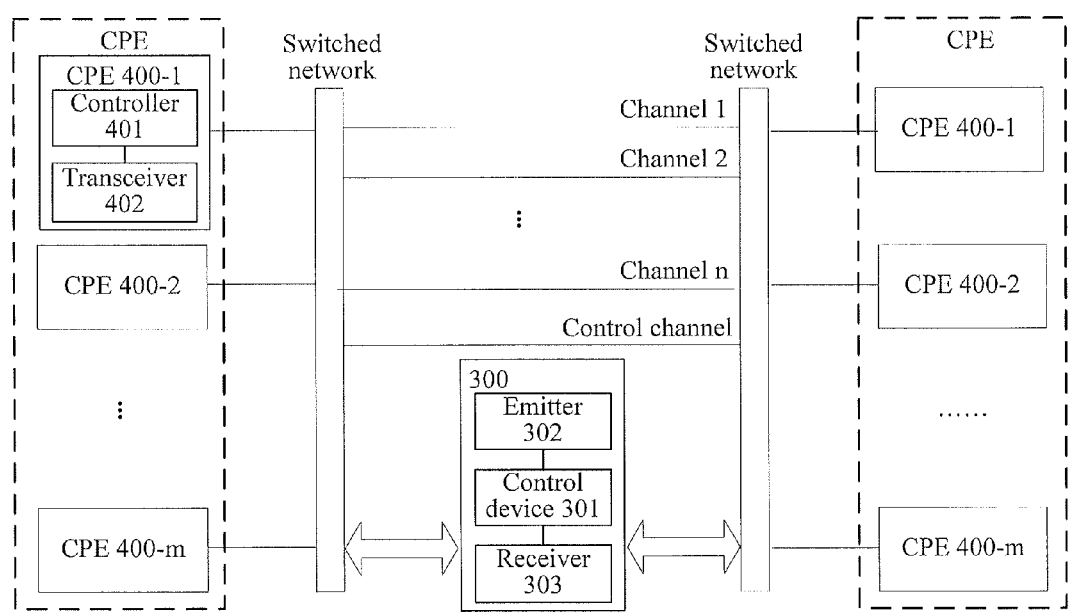
FIG. 13 is a structural diagram of a multi-channel sharing system including a channel assignment system and a CPE according to one embodiment of the present invention.

The present disclosure further provides a channel assignment system; FIG. 13 is a structural diagram of a multi-channel sharing system including a channel assignment system 300 and a plurality of CPEs 400-1, . . . , 400-m according to one embodiment of the present invention. The function of the channel assignment system 300 according to the embodiment of the present invention is similar to that of the control center described in the foregoing method embodiments.

As shown in FIG. 13, the channel assignment system 300 includes a control device 301, an emitter 302 and a receiver 303. The control device 301 is configured to select at least one idle channel from idle channels of the multi-channel sharing system as a control channel; the emitter 302 is in communication connection with the control device, and is configured to send an idle signal to the control channel, the idle signal identifying that the control channel is a control channel for a CPE to be positioned therein in a preset positioning manner; and the receiver 303 is configured to receive the communication request, wherein, when the receiver 303 receives a communication request, the control device 301 assigns the control channel to a CPE corresponding to the communication request.

Specifically, at first, when the control device 301 selects at least one idle channel from idle channels of the multi-channel sharing system as a control channel, the selection may be made randomly or made according to a preset selection rule, which is not limited herein. The control device 301 can select one idle channel, some idle channels or all idle channels from the multi-channel sharing system as control channels.

The manner of judging whether a channel is an idle channel may be any manner provided in the existing technology, for example, a channel with the minimum channel interference value is selected from all the channels as an idle channel.

Next, the emitter 302 sends an idle signal to the control channel, the idle signal identifying that the control channel is a control channel for a CPE to be positioned therein in a preset positioning manner.

In this embodiment, the emitter 302 sends an idle signal to all control channels, so that the CPE determines whether a channel is a control channel by judging whether the channel has the idle signal when the CPE scans the channels in the multi-channel sharing system.

The preset positioning manner includes, but is not limited to, cyclic fixed channel assignment, cyclic unfixed channel assignment and cyclic distributed channel assignment. When the control device 301 selects one idle channel from the multi-channel sharing system as a control channel, the CPE is positioned to the control channel through cyclic fixed channel assignment; when the control device 301 selects two or more idle channels from the multi-channel sharing system as control channels and sends an idle signal to the control channels, the CPE is positioned to one control channel in the multi-channel sharing system through cyclic unfixed channel assignment or cyclic distributed channel assignment.

The cyclic fixed channel assignment means that the CPE scans channels in the multi-channel sharing system according to a preset channel scan order, and when scanning a control channel having the idle signal, the CPE is positioned to the control channel having the idle signal.

The cyclic unfixed channel assignment means that, when communication is unnecessary, the CPE is positioned to one control channel in the multi-channel sharing system when the CPE cyclically scans the channels in the multi-channel sharing system according to a preset channel scan order all the time until the multi-channel sharing system receives a communication request.

If the CPE cyclically scans the channels in the multi-channel sharing system according to a preset channel scan order all the time, after the receiver 303 receives a calling request, when the control device 301 selects one control channel from all the control channels and the emitter 302 sends a holding signal, a CPE not in communication in the multi-channel sharing system scans the channels in the multi-channel sharing system according to a preset channel scan order, and when scanning a control signal having the holding signal, the CPE is locked to the control signal having the holding signal, so as to be positioned to the control signal having the holding signal; when the CPE receives a calling request input by a user, the CPE not in communication in the multi-channel sharing system scans the channels in the multi-channel sharing system according to a preset channel scan order, and is positioned to a first-scanned control channel having an idle signal.

The cyclic distributed channel assignment means that the CPE in the multi-channel sharing system scans the channels in the multi-channel sharing system according to a preset channel scan order, and is positioned to a first-scanned control channel having an idle signal.

In one embodiment of the present invention, when the control device 301 selects one idle channel from the multi-channel sharing system as a control channel, the emitter 302 sends an idle signal to the control channel, all CPEs not in communication in the multi-channel sharing system scan channels in the multi-channel sharing system according to a preset channel scan order, and when scanning a control channel having an idle signal, the CPEs are positioned to the control channel having an idle signal. As the control device 301 only selects one idle channel as a control channel and sends an idle signal to the control channel, all CPEs not in communication in the multi-channel sharing system are all positioned to the control channel.

In another embodiment of the present invention, when the control device 301 selects two or more idle channels from the multi-channel sharing system as control channels and the emitter 302 sends an idle signal to the control channels, if the receiver 303 receives a called request, the control device 301 selects one from all the control channels, the emitter 302 sends a holding signal to the selected control channel, all CPEs not in communication in the multi-channel sharing system scan channels in the multi-channel sharing system according to a preset channel scan order, and when scanning a control channel having the holding signal, the CPEs are locked to the control channel having the holding signal, so as to be positioned to the control channel having the holding signal; and if the CPE receives a calling request input by a user, all CPEs not in communication in the multi-channel sharing system scan channels in the multi-channel sharing system according to a preset channel scan order and are positioned to a first-scanned control channel having an idle signal.

In another embodiment of the present invention, when the control device 301 selects two or more idle channels from the multi-channel sharing system as control channels and the emitter 302 sends an idle signal to the control channels, all CPEs not in communication in the multi-channel sharing system scan channels in the multi-channel sharing system according to a preset channel scan order and are positioned to a first-scanned control channel having an idle signal.

Afterwards, when the receiver 303 receives a communication request, the control device 301 assigns the control channel to a CPE corresponding to the communication request. The communication request is a called request or a calling request.

When the control device 301 selects one idle channel from the multi-channel sharing system as a control channel, if the communication request is a called request, the assigning, by the control device 301, the control channel to a CPE corresponding to a communication request specifically includes:

sending, by the emitter 302, a selective call signal to the control channel, to match the CPE positioned to the control channel with the selective call signal by using the control device 301, and returning, by the receiver 303, an acknowledgement signal after successful matching.

In this embodiment, when the receiver 303 receives the called request, the control device 301 sends a selective call signal to the control channel, the selective call signal including a user ID (such as a telephone number) of a called user. All CPEs positioned to the control channel can receive the selective call signal through the control channel, each CPE matches the user ID included in the selective call signal with a user ID of the CPE (e.g., the local telephone number of the CPE), if the matching is successful, it indicates that a user of the CPE is the called user, and at this time, the CPE returns an acknowledgement signal to the control center through the control channel. If the matching is not successful, it indicates that the user of the CPE is not the called user, and an acknowledgement signal is no longer returned to the assignment system 300.

The receiver 303 receives the acknowledgement signal returned by the CPE, and the control device 301 assigns the control channel to the CPE that returns the acknowledgement signal.

In this embodiment, when the receiver 303 receives the acknowledgement signal returned by the CPE through the control channel, the control device 301 assigns the control channel through which the acknowledgement signal is received to the CPE that returns the acknowledgement signal, so that the CPE can communicate with other CPEs through the assigned control channel.

When the control device 301 selects one idle channel from the multi-channel sharing system as a control channel, if the communication request is a calling request, the assigning, by the control device 301, the control channel to a CPE corresponding to a communication request specifically includes:

when the communication request is a calling request sent by the CPE positioned to the control channel, assigning, by the control device 301, the control channel to the CPE that sends the calling request.

In this embodiment, when the CPE receives a calling request input by a user, the calling request is sent to the control center through the control channel, and after the receiver 303 receives the calling request sent by the CPE, the control device 301 assigns the control channel to the CPE that sends the calling request, so that the CPE occupies the control channel to communicate with another CPE that calls the CPE.

In another embodiment of the present invention, after the control device 301 assigns the control channel to a certain CPE, the control device 301 reselects one idle channel as a control channel, the emitter 302 sends an idle signal to the reselected control channel, and other CPEs, when finding that the control channel where they are originally positioned has been occupied, immediately rescan the channels in the multi-channel sharing system, search for and are positioned to a new control channel having an idle signal.

In the embodiment of the present invention, as all channels can be used as control channels and data channels, channel utilization is high. Moreover, as all CPEs not in communication are positioned on the same control channel, both a calling party and a called party can timely conduct communication immediately through the control channel where they are positioned, so that the call processing speed is faster, especially when applied to a multi-channel sharing system with a limited number of users, i.e., fewer users, the call processing speed is better.

In one embodiment of the present invention, the control device 301 selects two or more idle channels form the multi-channel sharing system as control channels, and the emitter 302 sends an idle signal to the control channels.

In this embodiment, two or more idle channels in the multi-channel sharing system are used as control channels, and the emitter 302 sends an idle signal to the control channels. CPEs not in communication in the multi-channel sharing system are always in a cyclic scan state, to scan a control channel having an idle signal in the multi-channel sharing system.

When a communication request received by the receiver 303 is a called request, the emitter 302 sends a holding signal to any control channel in all the control channels, to lock a CPE to a control channel having the holding signal.

In this embodiment, when the communication request received by the control receiver 303 is a called request, the emitter 302 sends a holding signal to any control channel in all the control channels. When a CPE not in communication in the multi-channel sharing system cyclically scans channels, if the CPE scans a control channel having the holding signal, the CPE is locked to the control channel having the holding signal, and the holding signal is kept for a period of time, until all CPEs not in communication in the multi-channel sharing system are locked to the control channel having the holding signal.

The emitter 302 sends a selective call signal to the control channel having the holding signal, to match the CPE locked to the control channel having the holding signal with the selective call signal, and returns an acknowledgement signal after successful matching.

In this embodiment, when CPEs not in communication in the multi-channel sharing system are locked to the control channel having the holding signal, the emitter 302 sends a selective call signal to the control channel having the holding signal, as the control channels through which the emitter 302 sends the holding signal and the selective call signal are the same control channel, that is, the CPEs previously locked to the control channel having the holding signal are locked to the control channel having the holding signal at this time, the CPEs locked to the control channel having the holding signal all can receive the selective call signal, a user ID in the selective call signal (e.g., a telephone number of a called user) is matched with user IDs of the CPEs (e.g., local telephone numbers of the CPEs), if the matching is successful, an acknowledgement signal is returned to the assignment system 300 through the control channel having the selective call signal, and if the matching is not successful, no acknowledgement signal is returned to the assignment system 300, and the locked control channel is immediately released, to perform cyclic scan once again.

The receiver 303 receives the acknowledgement signal, and the control device 301 assigns the control channel to the CPE that returns the acknowledgement signal.

In this embodiment, after the receiver 303 receives the acknowledgement signal returned by the CPE through the control channel, the control device 301 assigns the control channel to the CPE that returns the acknowledgement signal. As the control channel through which the acknowledgement signal is returned is the control channel where the CPE is previously locked, the control device 301 assigns the control channel to the CPE that returns the acknowledgement signal.

In this embodiment, as the control device 301 uses all the idle channels as control channels, the CPE in the multi-channel sharing system can scan different control channels through cyclic scan, when not receiving a called request, the CPE in the multi-channel sharing system will not be positioned to a certain channel, so that the selection of the communication channel is more flexible.

In one embodiment of the present invention, the control device 301 selects two or more idle channels from a multi-channel sharing system as control channels, and the emitter 302 sends an idle signal to the control channels.

When a communication request received by the receiver 303 is a calling request, the control device 301 assigns a control channel to a CPE that sends the calling request. The control channel scanned by the CPE that sends the calling request refers to a control channel in the multi-channel sharing system first scanned by the CPE according to a preset channel scan order after receiving a calling request input by a user.

In this embodiment, a CPE not in communication in the multi-channel sharing system can scan a control channel having an idle signal in the multi-channel sharing system through cyclic scan, when the CPE not in communication in the multi-channel sharing system receives a calling request input by a user and scans a control channel having an idle signal in the multi-channel sharing system through cyclic scan, the CPE is positioned to a first-scanned control channel having an idle signal and sends a calling request to the first-scanned control channel having an idle signal, and at this time, the control device 301 assigns the control channel to the CPE that sends the calling request, and the CPE occupies the control channel for communication. The CPEs cyclically scan the channels in different orders.

In this embodiment, as two or more idle channels are used as control channels and the CPEs scan the channels in different orders, the CPEs, when receiving a calling request input by a user, use a control channel scanned to send the calling request to the assignment system 300, which greatly reduces the probability that two users simultaneously initiate a calling request and simultaneously occupy the same control channel, that is, the method in this embodiment can effectively reduce simultaneous-hold probability of the control channel.

In one embodiment of the present invention, the control device 301 selects two or more idle channels from a multi-channel sharing system as control channels, and the emitter 302 sends an idle signal to the control channels, to make CPEs respectively positioned to control channels first scanned.

In this embodiment, the control device 301 uses two or more idle channels from a multi-channel sharing system as control channels, and the emitter 302 sends an idle signal to the control channels. CPEs not in communication in the multi-channel sharing system scan all channels in the multi-channel sharing system and are respectively positioned to control channels first scanned. The CPEs not in communication in the multi-channel sharing system scan all channels in the multi-channel sharing system randomly, so the control channels where the CPEs are positioned are also scattered.

The control device 301 assigns a control channel to the CPE corresponding to the communication request when the receiver 303 receives the communication request. The specific process thereof is as follows:

When the communication request received by the receiver 303 is a called request, the emitter 302 sends a selective call signal to the control channels, to match CPEs positioned to the control channels with the selective call signal, and a CPE successfully matching the selective call signal returns an acknowledgement signal through the control channel where it is positioned.

In this embodiment, when the communication request received by the receiver 303 is a called request, the emitter 302 sends a selective call signal to the control channels, in this way, the CPEs all can receive the selective call signal through control channels where they are positioned, the control device 301 matches a user ID in the selective call signal (e.g., a telephone number of a called user) with user IDs of the CPEs (e.g., local telephone numbers of the CPEs), the CPE successfully matching the selective call signal returns an acknowledgement signal to the assignment system 300 through the control channel where it is positioned, and other CPEs not successfully matching the selective call signal no longer return an acknowledgement signal to the assignment system 300.

The receiver 303 receives the acknowledgement signal, and the control device 301 assigns the control channel to the CPE that returns the acknowledgement signal.

In this embodiment, a control channel through which the acknowledgement signal is returned is the control channel where the CPE that returns the acknowledgement signal is positioned, therefore, when the control device 301 assigns the control channel through which the acknowledgement signal is returned to the CPE that returns the acknowledgement signal after the receiver 303 receives the acknowledgement signal, that is, assigns the control channel to the CPE that returns the acknowledgement signal, the CPE can communicate with a calling user through the control channel after occupying the control channel.

In another embodiment of the present invention, the assigning, by the control device 301, a control channel to the CPE corresponding to the communication request when the receiver 303 receives the communication request specifically includes:

when the communication request received by the receiver 303 is a calling request, assigning, by the control device 301, a control channel to a CPE that sends the calling request.

In this embodiment, when the CPE receives a calling request input by a user, the CPE sends the calling request through the control channel where it is positioned, and the control device 301 assigns the control channel where the CPE that sends the calling request is positioned to the CPE that sends the calling request after the receiver 303 receives the calling request through the control channel.

In the embodiment of the present invention, before the CPE conducts communication, CPEs in the multi-channel sharing system are respectively positioned to control channels scanned first, so communication can be conducted immediately by using the control channels where the CPEs are positioned upon receipt of a calling request, the emitter 302 sends a selective call signal on all the control channels at the same time upon receipt of a called request, and the CPEs all can receive the selective call signal, to cause a called speed to be fast, that is, the method causes a call processing speed to be fast. In addition, as the CPEs are respectively positioned to control channels scanned first, the control channels where the CPEs are positioned are scattered, thereby significantly reducing the probability that multiple CPEs simultaneously hold the same control channel, that is, the simultaneous-hold probability of the control channel is reduced.

The present disclosure further provides a CPE 400 that uses a channel for communication. FIG. 13 is a structural diagram of a multi-channel sharing system including a channel assignment system 300 and a plurality of CPEs 400-1, . . . , 400-m according to one embodiment of the present invention. By taking the CPE 400-1 as an example, it may include: a controller 401, configured to position the CPE to one control channel in a multi-channel sharing system in a preset positioning manner, the control channel being an idle channel having an idle signal in the multi-channel sharing system; and a transceiver 402 in communication connection with the controller, configured to use the control channel for communication in response to a communication request.

At first, the controller 401 positions the CPE to one control channel in a multi-channel sharing system in a preset positioning manner. The control channel is an idle channel having an idle signal in the multi-channel sharing system.

The preset positioning manner includes, but is not limited to, cyclic fixed channel assignment, cyclic unfixed channel assignment and cyclic distributed channel assignment.

When the control device 301 selects one idle channel as a control channel and the emitter 302 sends an idle signal to the control channel, the positioning, by the controller 401, the CPE 400 to one control channel in a multi-channel sharing system through cyclic fixed channel assignment specifically includes:

scanning, by the controller 401, channels in the multi-channel sharing system, and when a control channel having an idle signal is scanned, positioning, by the controller 401, the CPE 400 to the control channel having an idle signal.

When the control device 301 selects two or more idle channels as control channels and the emitter 302 sends an idle signal to the control channels, the positioning, by the controller 401, the CPE 400 to one control channel in a multi-channel sharing system through cyclic unfixed channel assignment specifically includes:

positioning, by the controller 401, the CPE 400 to one control channel in the a multi-channel sharing system when the controller 401 in the CPE 400 of the multi-channel sharing system cyclically scans channels in the multi-channel sharing system according to a preset channel scan order until the multi-channel sharing system receives a communication request.

The positioning, by the controller 401, the CPE 400 to one control channel in the a multi-channel sharing system when the controller 401 in the CPE 400 of the multi-channel sharing system cyclically scans channels in the multi-channel sharing system according to a preset channel scan order until the multi-channel sharing system receives a communication request specifically includes:

when the communication request is a called request, scanning, by the controller 401, the channels in the multi-channel sharing system according to a preset channel scan order, wherein, when scanning a control channel having a holding signal, the controller 401 locks the CPE 400 to the control channel having the holding signal, so as to position the CPE 400 to the control channel having the holding signal; and when the communication request is a calling request, scanning, by the controller 401, the channels in the multi-channel sharing system according to a preset channel scan order when the transceiver 402 receives a calling request input by a user, and positioning the CPE 400 to a first-scanned control channel having an idle signal.

When the control device 301 selects two or more idle channels as control channels and the emitter 302 sends an idle signal to the control channels, the positioning, by the controller 401, the CPE 400 to one control channel in a multi-channel sharing system through cyclic distributed channel assignment specifically includes:

scanning, by the controller 401 in the CPE 400 of the multi-channel sharing system, the channels in the multi-channel sharing system according to a preset channel scan order, and positioning the CPE 400 to a first-scanned control channel having an idle signal.

The transceiver 402 uses the control channel where the CPE 400 is positioned for communication in response to a communication request.

When the control device 301 selects one idle channel as a control channel, the emitter 302 sends an idle signal to the control channel and the controller 401 positions the CPE 400 to one control channel in the multi-channel sharing system through cyclic fixed channel assignment, the using, by the transceiver 402, the control channel where the CPE 400 is positioned for communication when the transceiver 402 receives a communication request specifically includes:

when the communication request is a called request, matching the controller 401 with a selective call signal in the control channel where the CPE 400 is positioned, and returning, by the transceiver 402, an acknowledgement signal to the assignment system 300 after successful matching, to cause the control device 301 to assign the control channel where the CPE 400 is positioned to the CPE 400; and when the communication request is a calling request, sending, by the transceiver 402, the calling request to the control center through the control channel where the CPE 400 is positioned, to cause the control device 301 to assign the control channel where the CPE 400 is positioned to the CPE 400.

When the control device 301 selects two or more idle channels as control channels and sends an idle signal to the control channels, the using, by the transceiver 402, the control channel where the CPE 400 is positioned for communication when the controller 401 positions the CPE 400 to one control channel in the multi-channel sharing system through cyclic unfixed channel assignment specifically includes:

when the communication request is a called request, matching the controller 401 with a selective call signal in a control channel where the CPE 400 is locked, and returning, by the transceiver 402, an acknowledgement signal to the assignment system 300 after successful matching, to cause the control device 301 to assign the control channel where the CPE 400 is locked to the CPE; and when the communication request is a calling request, sending, by the transceiver 402, the calling request to the assignment system 300 through a control channel first scanned by the controller 401, to cause the control device 301 to assign the control channel first scanned by the controller 401 to the CPE 400.

When the control device 301 selects two or more idle channels as control channels and the emitter 302 sends an idle signal to the control channels, the using, by the transceiver 402, the control channel where the CPE 400 is positioned for communication when the controller 401 positions the CPE 400 to one control channel in the multi-channel sharing system through cyclic distributed channel assignment specifically includes:

when the communication request is a called request, matching the controller 401 with a selective call signal in a control channel scanned initially, and returning, by the transceiver 402, an acknowledgement signal to the assignment system 300 after successful matching, to cause the control device 301 to assign the control channel first scanned by the controller 401 to the CPE 400; and when the communication request is a calling request, sending, by the transceiver 402, the calling request to the assignment system 300 through a control channel first scanned by the controller 401, to cause the control device to assign the control channel first scanned by the CPE to the CPE 400.

Figure 7:
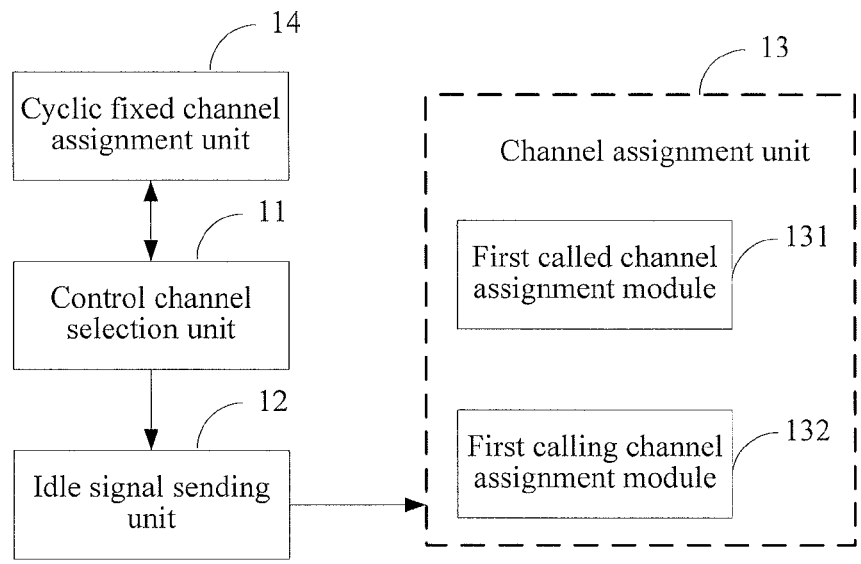
FIG. 7 is a structural block diagram of a channel assignment apparatus according to one embodiment of the present invention.

The present disclosure further provides a channel assignment apparatus. FIG. 7 is a structural block diagram of a channel assignment apparatus according to one embodiment of the present invention, and for ease of description, only illustrates parts related to the embodiment of the present invention.

The channel assignment apparatus may be used in a control center or the like, which may be a software unit, a hardware unit or a unit where software and hardware are combined that runs in the control center, or may be integrated into the control center as a separate pendant or run in an application system of the control center, and is detailed as follows:

The channel assignment apparatus includes a control channel selection unit 11, an idle signal sending unit 12 and a channel assignment unit 13.

The control channel selection unit 11 selects at least one idle channel from idle channels of a multi-channel sharing system as a control channel.

The idle signal sending unit 12 sends an idle signal to all control channels, the idle signal identifying that the control channel is a control channel for a CPE to be positioned therein in a preset positioning manner.

The channel assignment unit 13 assigns the control channel to a CPE corresponding to a communication request upon receipt of the communication request.

In another embodiment of the present invention, when one idle channel is selected as a control channel, the channel assignment unit 13 includes a first called channel assignment module 131 and a first calling channel assignment module 132.

The first called channel assignment module 131 sends a selective call signal to the control channel when the communication request is a called request, to make the CPE positioned to the control channel match the selective call signal and return an acknowledgement signal after successful matching, receives the acknowledgement signal, and assigns the control channel to the CPE that returns the acknowledgement signal.

When the communication request is a calling request sent by the CPE positioned to the control channel, the first calling channel assignment module 132 assigns the control channel to the CPE that sends the calling request.

In another embodiment of the present invention, the apparatus further includes a cyclic fixed channel assignment unit 14. The cyclic fixed channel assignment unit 14, after the channel assignment unit 13 assigns the control channel to the CPE corresponding to the communication request, reselects one idle channel as a control channel and sends an idle signal to the control channel, to cause the CPE to be positioned to the control channel.

Figure 8:
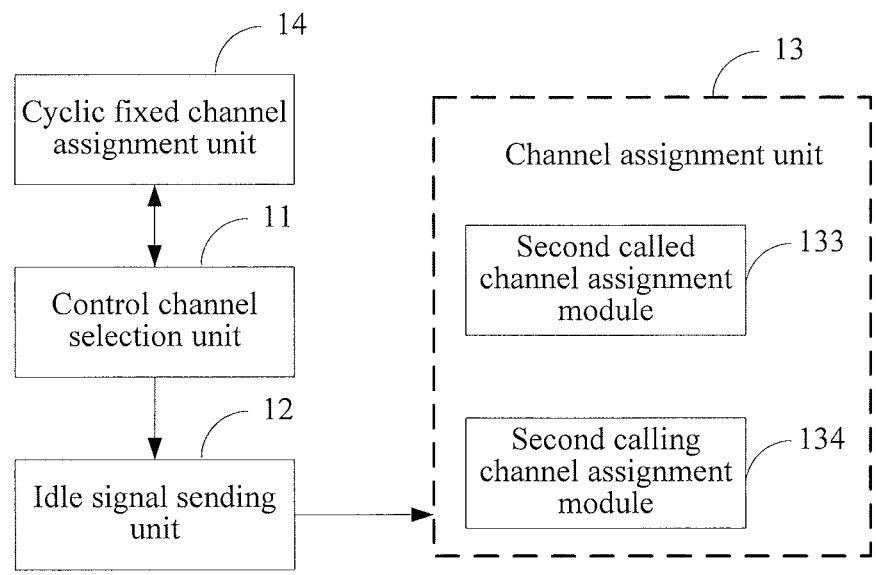
FIG. 8 is a structural block diagram of a channel assignment apparatus according to another embodiment of the present invention.

FIG. 8 illustrates a structure of a channel assignment apparatus according to another embodiment of the present invention, which is different from the channel assignment apparatus shown in FIG. 7 merely in that, when two or more idle channels are selected as control channels, the channel assignment unit 13 includes a second called channel assignment module 133 and a second calling channel assignment module 134.

When the communication request is a called request, the second called channel assignment module 133 sends a holding signal to any one of the control channels, to lock the CPE to a control channel having the holding signal, sends a selective call signal to the control channel having the holding signal, to cause the CPE locked to the control channel having the holding signal to match the selective call signal and to return an acknowledgement signal after successful matching, receives the acknowledgement signal, and assigns the control channel to the CPE that returns the acknowledgement signal.

When the communication request is a calling request, the second calling channel assignment module 134 assigns a control channel to a CPE that sends the calling request, wherein the control channel is a control channel in the multi-channel sharing system first scanned by the CPE according to a preset channel scan order upon receipt of the calling request input by a user.

Figure 9:
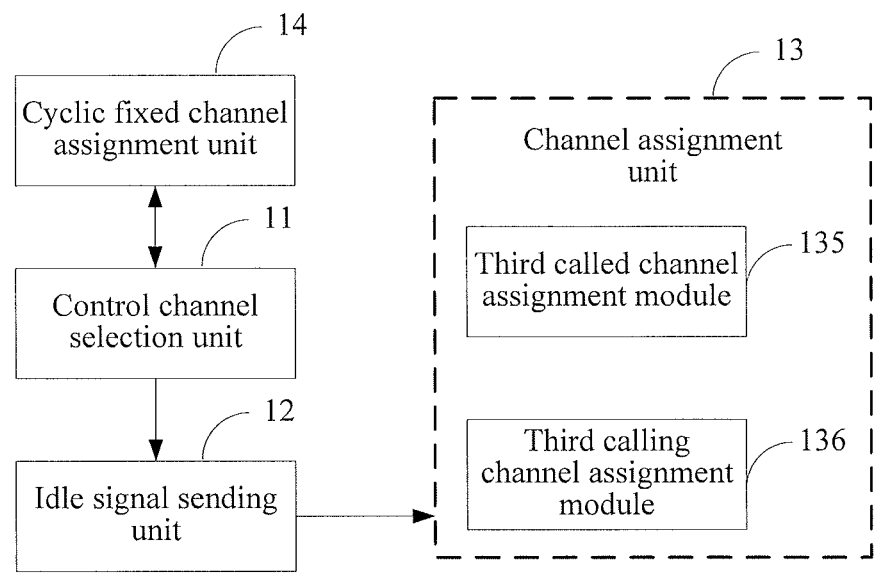
FIG. 9 is a structural block diagram of a channel assignment apparatus according to a further embodiment of the present invention.

FIG. 9 illustrates a structure of a channel assignment apparatus according to another embodiment of the present invention, which is different from the channel assignment apparatus shown in FIG. 7 merely in that, when two or more idle channels are selected as control channels, the channel assignment unit 13 includes a third called channel assignment module 135 and a third calling channel assignment module 136.

When the communication request is a called request, the third called channel assignment module 135 sends a selective call signal to all control channels, to make CPEs positioned to the control channel match the selective call signal and a CPE successfully matching the selective call signal return an acknowledgement signal, receives the acknowledgement signal, and assigns the control channel to the CPE that returns the acknowledgement signal.

When the communication request is a calling request, the third calling channel assignment module 136 assigns a control channel to a CPE that sends the calling request, wherein the control channel positioned by the CPE that sends the calling request is a control channel in the multi-channel sharing system first scanned by the CPE according to a preset channel scan order.

Figure 10:
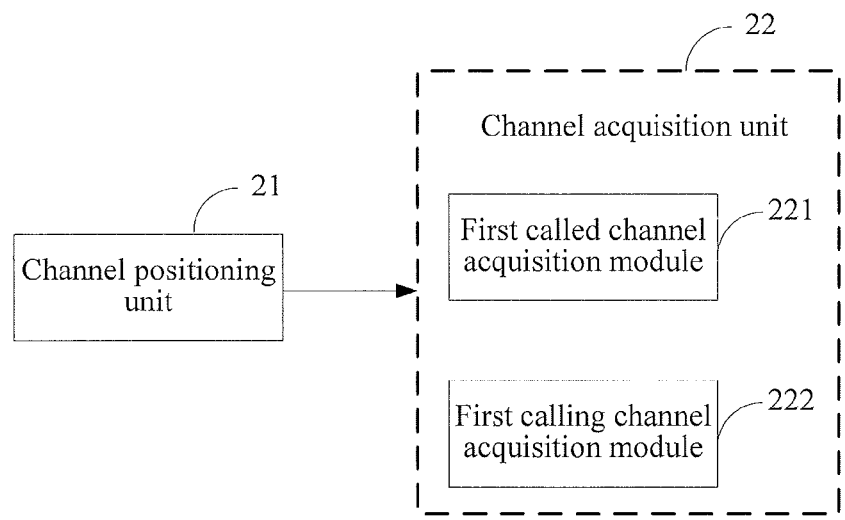
FIG. 10 is a structural block diagram of an apparatus that uses a channel for communication according to one embodiment of the present invention.

The present disclosure further provides an apparatus that uses a channel for communication. FIG. 10 is a structural block diagram of an apparatus that uses a channel for communication according to one embodiment of the present invention, and for ease of description, only illustrates parts related to the embodiment of the present invention.

The apparatus that uses a channel for communication may be used in a CPE or the like, which may be a software unit, a hardware unit or a unit where software and hardware are combined that runs in the control center, or may be integrated into the control center as a separate pendant or run in an application system of the control center, and is detailed as follows:

The apparatus that uses a channel for communication includes a channel positioning unit 21 and a channel acquisition unit 22.

The channel positioning unit 21 is positioned to one control channel in a multi-channel sharing system in a preset positioning manner, the control channel being an idle channel having an idle signal in the multi-channel sharing system.

When receiving a communication request, the channel acquisition unit 22 uses the control channel as a channel acquired by the CPE for communication.

When one idle channel is selected as a control channel and an idle signal is sent to the control channel, the channel positioning unit 21 is specifically configured to scan channels in the multi-channel sharing system, and when scanning a control channel having the idle signal, position the CPE to the control channel having the idle signal.

The channel acquisition unit 22 specifically includes a first called channel acquisition module 221 and a first calling channel acquisition module 222.

When the communication request is a called request, the first called channel acquisition module 221 matches a CPE with a selective call signal in the control channel, and returns an acknowledgement signal to the control center after successful matching, to cause the control center to assign the control channel to the CPE.

When the communication request is a calling request, the first calling channel acquisition module 222 sends a calling request to the control center through the control channel, to cause the control center to assign the control channel to the CPE.

Figure 11:
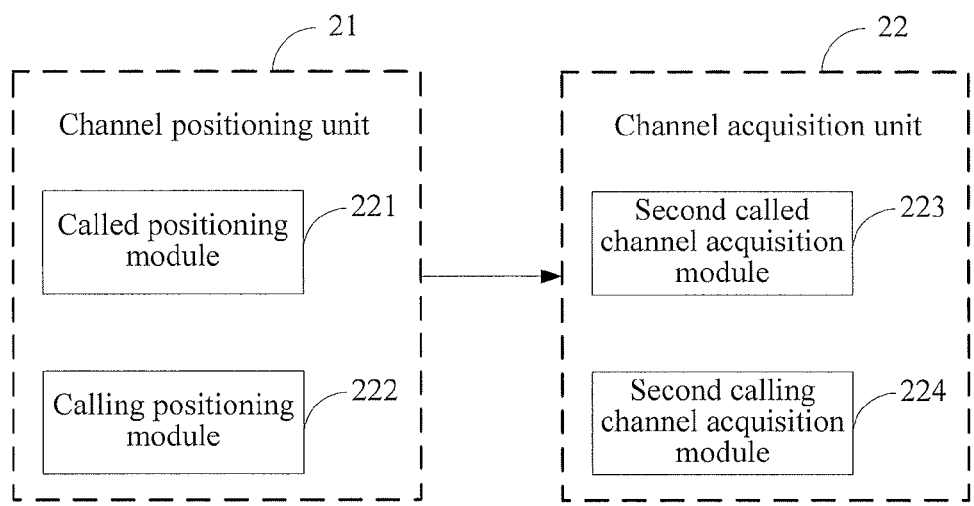
FIG. 11 is a structural block diagram of an apparatus that uses a channel for communication according to another embodiment of the present invention.

FIG. 11 is a structural block diagram of an apparatus that uses a channel for communication according to another embodiment of the present invention. When two or more idle channels are selected as control channels and an idle signal is sent to all the control channels, the channel positioning unit 22 is specifically configured to position the CPE to one control channel in the multi-channel sharing system when the CPE in the multi-channel sharing system cyclically scans channels in the multi-channel sharing system according to a preset channel scan order until the multi-channel sharing system receives a communication request.

In this embodiment, the channel positioning unit 21 specifically includes a called positioning module 211 and a calling positioning module 212.

When the communication request is a called request, the called positioning module 211 scans channels in the multi-channel sharing system according to a preset channel scan order, and when a control channel having a holding signal is scanned, the CPE is locked to the control channel having a holding signal.

When the communication request is a calling request, the calling positioning module 212 scans channels in the multi-channel sharing system according to a preset channel scan order when the CPE receives a calling request input by a user, and positions the CPE to a control channel having a holding signal scanned initially.

The channel acquisition unit 22 specifically includes a second called channel acquisition module 223 and a second calling channel acquisition module 224.

When the communication request is a called request, the second called channel acquisition module 223 matches the CPE with a selective call signal in a control channel where the CPE is locked, and returns an acknowledgement signal to the control center after successful matching, to cause the control center to assign the control channel where the CPE is locked to the CPE.

When the communication request is a calling request, the second calling channel acquisition module 224 makes the CPE send a calling request to the control center through a control channel scanned initially, to cause the control center to assign the control channel first scanned by the CPE to the CPE.

Figure 12:
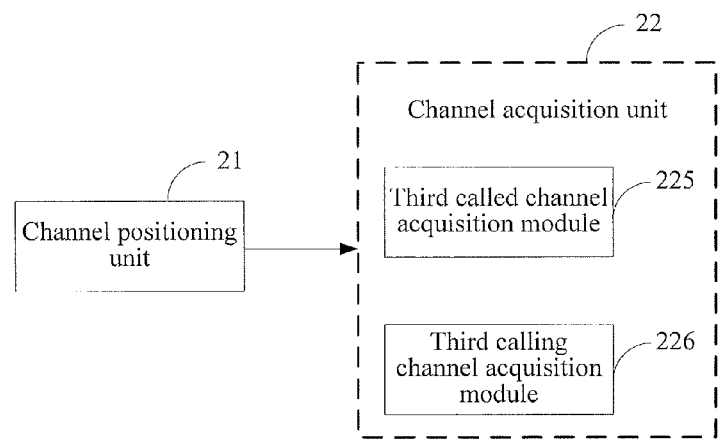
FIG. 12 is a structural block diagram of an apparatus that uses a channel for communication according to a further embodiment of the present invention.

FIG. 12 is a structural block diagram of an apparatus that uses a channel for communication according to a further embodiment of the present invention, which is different from the apparatus that uses a channel for communication shown in FIG. 10 merely in that, when two or more idle channels are selected as control channels and an idle signal is sent to all the control channels, the channel positioning unit 21 is specifically configured to make a CPE in a multi-channel sharing system scan channels in the multi-channel sharing system according to a preset channel scan order, and positioned to a first-scanned control channel having an idle signal.

The channel acquisition unit specifically includes a third called channel acquisition module 225 and a third calling channel acquisition module 226.

When the communication request is a called request, the third called channel acquisition module 225 matches the CPE with a selective call signal in the control channel scanned initially, and returns an acknowledgement signal to the control center after successful matching, to cause the control center to assign the control channel first scanned by the CPE to the CPE.

When the communication request is a calling request, the third calling channel acquisition module 226 makes the CPE send the calling request to the control center through the control channel scanned initially, to cause the control center to assign the control channel first scanned by the CPE to the CPE.

It should be noted that, the units included in the system are only divided according to functional logic, but the system is not limited to the division, as long as the division can implement corresponding functions; in addition, specific name of each functional unit is only intended to facilitate distinguishing each other, but not to limit the protection scope of the present disclosure.

A person skilled in the art should understand that, adaptive changes can be made to modules in the apparatus in each embodiment, and the modules are disposed in one or more apparatuses different from the embodiment. Several modules in the embodiment can be combined into one module or unit or component, or the modules can be divided into a plurality of sub-modules or sub-units or sub-components. Except the situation where features and/or processing are mutually exclusive, any combination can be adopted to combine all the steps of any method or all the modules of any apparatus disclosed in the specification. Unless otherwise expressly stated, each feature disclosed in the specification can be replaced with alternative features providing the same, equivalent or similar purpose.

All or some of the steps in the method of the foregoing embodiments may be implemented by a program instructing relevant hardware, and each apparatus embodiment of the present invention can be implemented by hardware, implemented by a software module running on one or more processors, or implemented by a combination thereof. A person skilled in the art should understand that, in practice, some or all of the functions of some or all of the modules in the apparatus according to the embodiments of the present invention can be implemented by using a single chip microcomputer, a micro control unit (MCU), a microprocessor, a digital signal processor (DSP) or the like. The present disclosure may also be implemented as an apparatus program (for example, a computer program or a computer program product) configured to perform the method described herein.

The present disclosure further provides a computer program product, including a computer executable code, wherein, when the computer executable code runs on a server of a multi-channel sharing system, the server performs the steps in each embodiment of the channel assignment method. For example, it can cause the server to perform steps S101, S102 and S103 in the channel assignment method: selecting at least one idle channel from idle channels of the multi-channel sharing system as a control channel; sending an idle signal to the control channel, the idle signal identifying that the control channel is a control channel for a CPE to be positioned therein in a preset positioning manner; and assigning the control channel to a CPE corresponding to a communication request upon receipt of the communication request. Optionally, the computer program can be stored on a computer readable storage medium, such as an ROM/RAM, a magnetic disk or an optical disk.

The present disclosure further provides a computer program product, including a computer executable code, wherein, when the computer executable code runs on a CPE, the CPE performs the steps in each embodiment of the channel assignment method. For example, it can cause the CPE to perform steps S501 and S502 in the channel assignment method: positioning the CPE to one control channel in a multi-channel sharing system in a preset positioning manner, the control channel being an idle channel having an idle signal in the multi-channel sharing system; and using the control channel where the CPE is positioned for communication in response to a communication request. Optionally, the computer program can be stored on a computer readable storage medium, such as an ROM/RAM, a magnetic disk or an optical disk.

In the embodiments of the present invention, by selecting one idle channel as a control channel, positioning a CPE to the control channel after the CPE scans the control channel, and conducting communication through the control channel, not only can dynamic assignment of the channel be achieved, but also the amount of computation of the dynamic assignment is not great and control complexity of the dynamic assignment is lower. In addition, all idle channels are used as control channels, and upon receipt of a communication request, one is selected from the control channels or a certain control channel is scanned according to a preset channel scan order and positioned, thereby reducing the channel simultaneous-hold probability. All idle channels are used as control channels, a CPE scans channels according to a preset channel scan order and is positioned to a control channel scanned first, and upon receipt of a communication request, communication is conducted through the positioned control channel, thereby not only reducing the channel simultaneous-hold probability but also improving the call speed.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A channel assignment method, the method comprising:
    at a multi-channel sharing system that is communicatively coupled to a plurality of customer premise equipments:
        selecting at least one idle channel from idle channels of the multi-channel sharing system as a control channel;
        sending an idle signal to the control channel, the idle signal identifying that the control channel is a control channel for a customer premise equipment (CPE) to be positioned therein in a preset positioning manner; and
        upon receipt of a communication request from a CPE positioned to the control channel, assigning the control channel to the CPE, the assigning further comprising:
            when the communication request is a called request:
                sending a selective call signal to the control channel;
                matching the selective call signal with the CPE positioned to the control channel;
                receiving an acknowledgement signal returned by the CPE after successful matching; and
                assigning the control channel to the CPE that returns the acknowledgement signal; and
            when the communication request is a calling request sent by the CPE positioned to the control channel, assigning the control channel to the CPE that sends the calling request.

2. The method according to claim 1, the method further comprising:
    after assigning the control channel to the CPE:
        reselecting one of the idle channels as a control channel; and
        sending an idle signal to the control channel.

3. The method according to claim 1, wherein, when two or more of the idle channels are selected as control channels, the assigning further comprises:

when the communication request is the called request:
   sending a holding signal to any one of the control channels, the holding signal identifying that the control channel is a channel to be locked by the CPE;
   sending a selective call signal to the control channel having the holding signal;
   matching the selective call signal with the CPE locked to the control channel having the holding signal;
   receiving an acknowledgement signal returned by the CPE after successful matching; and
   assigning the control channel to the CPE that returns the acknowledgement signal; and
when the communication request is the calling request:
   sending a control channel scanned by the CPE that sends the calling request to the CPE that sends the calling request, wherein the control channel is a control channel in the multi-channel sharing system first scanned by the CPE according to a preset channel scan order when receiving the calling request input by a user.

4. The method according to claim 1, wherein, when two or more of the idle channels are selected as control channels, the assigning further comprises:
when the communication request is the called request:
   sending a selective call signal to the control channels;
   matching the selective call signal with the CPE positioned to the control channel;
   receiving an acknowledgement signal returned by the CPE after successful matching; and
   assigning the control channel to the CPE that returns the acknowledgement signal; and
when the communication request is the calling request:
   assigning a control channel to a CPE that sends the calling request and is positioned to the control channel, wherein the control channel is a control channel in the multi-channel sharing system first scanned by the CPE according to a preset channel scan order.

5. A method of using a channel for communication, the method comprising:
at a customer premise equipment (CPE) that is communicatively coupled to a multi-channel sharing system:
   scanning channels in the multi-channel sharing system for one or more control channels having idle signals;
   positioning one of the one or more control channels in a multi-channel sharing system in a preset positioning manner, the control channel being an idle channel having an idle signal in the multi-channel sharing system; and
   using the control channel for communication in response to a communication request, further comprising:
     when the communication request is a called request:
       matching the CPE with a selective call signal in the control channel;
       returning an acknowledgement signal to the multi-channel sharing system after successful matching; and
       using the control channel assigned by the multi-channel sharing system for communication with another CPE; and
     when the communication request is a calling request:
       sending the calling request to the multi-channel sharing system through the control channel; and
       using the control channel assigned by the multi-channel sharing system for communication with another CPE.

6. The method according to claim 5, wherein, when two or more control channels having idle signal are scanned, the positioning further comprises:
   positioning the CPE to one of the control channels in the multi-channel sharing system by cyclically scanning the control channels in the multi-channel sharing system according to a preset channel scan order until the multi-channel sharing system receives the communication request.

7. The method according to claim 6, wherein, positioning the CPE to one of the control channels in the multi-channel sharing system by cyclically scanning the control channels in the multi-channel sharing system according to a preset channel scan order until the multi-channel sharing system receives the communication request further comprises:
when the communication request is the called request:
   scanning the control channels in the multi-channel sharing system according to the preset channel scan order; and
   after scanning a control channel having a holding signal, locking the CPE to the control channel having a holding signal; and
when the communication request is the calling request:
   scanning the control channels in the multi-channel sharing system according to the preset channel scan order in response to the calling request; and
   positioning the CPE to a first-scanned control channel having an idle signal.

8. The method according to claim 6, wherein, when two or more control channels having idle signal are scanned, the positioning further comprises:
   scanning the control channels in the multi-channel sharing system according to a preset channel scan order, and positioning the CPE to a first-scanned control channel having an idle signal.

9. The method according to claim 8, wherein the using the control channel for communication in response to a communication request further comprises:
when the communication request is the called request:
   matching the CPE with a selective call signal in the control channel first scanned by the CPE;
   returning an acknowledgement signal to the multi-channel sharing system after successful matching; and
   using the control channel first scanned by the CPE for communication with the CPE; and
when the communication request is the calling request:
   sending the calling request to the multi-channel sharing system through the control channel first scanned by the CPE, and using the control channel first scanned by the CPE for communication with the CPE.

10. The method according to claim 9, wherein the using the control channel for communication in response to a communication request further comprises:
when the communication request is the called request:
   matching the CPE with a selective call signal in the control channel where the CPE is locked;
   returning an acknowledgement signal to the multi-channel sharing system after successful matching; and
   using the control channel where the CPE is locked for communication with the other CPE; and
when the communication request is the calling request:
   sending the calling request to a control center through the control channel first scanned by the CPE; and
   using the control channel first scanned by the CPE for communication with the CPE.

11. A channel assignment system in association with a multi-channel sharing system, the channel assignment system comprising:
a control device, configured to select at least one idle channel from idle channels of the multi-channel sharing system as a control channel;
an emitter in communication connection with the control device, configured to send an idle signal to the control channel, the idle signal identifying that the control channel is a control channel for a customer premise equipment (CPE) to be positioned therein in a preset positioning manner; and
a receiver, configured to receive a communication request from a CPE,
wherein the control device is configured to, upon receipt of the communication request, assign the control channel to the CPE, the assigning further comprising:
when the communication request is a called request:
sending a selective call signal to the control channel;
matching the selective call signal with the CPE positioned to the control channel;
receiving an acknowledgement signal returned by the CPE after successful matching; and
assigning the control channel to the CPE that returns the acknowledgement signal; and
when the communication request is a calling request sent by the CPE positioned to the control channel, assigning the control channel to the CPE that sends the calling request.

12. The system according to claim 11, wherein, after assigning the control channel to the CPE, the control device is configured to reselect one of the idle channels as a control channel, and the emitter is configured to send an idle signal to the control channel.

13. The system according to claim 11, wherein, when two or more of the idle channels are selected as control channels:
when the communication request is the called request:
the emitter is configured to send a holding signal to any one of the control channels, the holding signal identifying that the control channel is a channel to be locked by the CPE, and send a selective call signal to the control channel having the holding signal;
the control device is configured to match the selective call signal with the CPE locked to the control channel having the holding signal;
the receiver is configured to receive an acknowledgement signal returned by the CPE after successful matching; and
the control device is configured to assign the control channel to the CPE that returns the acknowledgement signal; and
when the communication request is the calling request:
the control device is configured to assign a control channel to a CPE that sends the calling request, wherein the control channel is a control channel in the multi-channel sharing system first scanned by the CPE according to a preset channel scan order after receiving the calling request input by a user.

14. The system according to claim 11, wherein, when two or more of the idle channels are selected as control channels and the communication request is received,
when the communication request is the called request:
the emitter is configured to send a selective call signal to the control channels;
the control device is configured to match the selective call signal with the CPE positioned to the control channel;
the receiver is configured to receive an acknowledgement signal returned by the CPE after successful matching; and
the control device is configured to assign the control channel to the CPE that returns the acknowledgement signal; and
when the communication request is the calling request:
the control device is configured to assign a control channel to a CPE that sends the calling request, wherein the control channel is a control channel in the multi-channel sharing system first scanned by the CPE according to a preset channel scan order.

* * * * *